US006420812B1

United States Patent
Emery (10) Patent No.: US 6,420,812 B1
(45) Date of Patent: Jul. 16, 2002

(54) HIGH VOLTAGE GENERATOR STATOR COILS AND METHODS OF FORMING SAME

(75) Inventor: Franklin T. Emery, Ft. Payne, AL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 21 days.

(21) Appl. No.: 09/656,567

(22) Filed: Sep. 7, 2000

(51) Int. Cl.⁷ .................................................. H02K 3/40
(52) U.S. Cl. ......................... 310/196; 310/45; 174/127; 174/120 R; 174/120 SC
(58) Field of Search .......................... 310/196, 45, 201; 174/127, 120 SC, 120 R (56) References Cited

U.S. PATENT DOCUMENTS

| | | | |
|---|---|---|---|
| 2,049,073 A | | 7/1936 | Morrison ..................... 173/266 |
| 3,254,150 A | | 5/1966 | Rogers, Jr. .................... 174/17 |
| 3,259,684 A | | 7/1966 | Wakefield .................... 174/36 |
| 3,483,413 A | | 12/1969 | Logan ......................... 310/271 |
| 3,563,850 A | * | 2/1971 | Stackhouse et al. ........ 310/196 |
| 4,254,351 A | | 3/1981 | Smith et al. .................. 310/45 |
| 4,388,546 A | | 6/1983 | Schwanzer .................. 310/196 |
| 4,403,163 A | * | 9/1983 | Armerding et al. ......... 310/213 |
| 4,760,296 A | | 7/1988 | Johnston et al. .............. 310/45 |
| 4,831,303 A | | 5/1989 | Rowe et al. ................. 310/260 |
| 4,853,565 A | | 8/1989 | Elton et al. ................... 310/45 |
| 5,030,870 A | | 7/1991 | Wichmann .................. 310/215 |
| 5,066,881 A | | 11/1991 | Elton et al. .................. 310/213 |
| 5,175,396 A | | 12/1992 | Emery et al. ................. 174/36 |
| 5,723,920 A | | 3/1998 | Markovitz et al. ............ 310/42 |
| 5,760,516 A | * | 6/1998 | Baumann et al. ........... 310/201 |
| 5,973,269 A | | 10/1999 | Draper et al. ................ 174/120 |
| 6,043,582 A | | 3/2000 | Markovitz et al. .......... 310/213 |

FOREIGN PATENT DOCUMENTS

EP 000683559a2 * 11/1995 ............ H02K/3/02

* cited by examiner

Primary Examiner—Burton S. Mullins (57) ABSTRACT

The present invention provides a high voltage generator stator coil for power generation systems for preventing partial discharge. The high voltage generator stator coil preferably includes a plurality of metal strands that form a high voltage conductor, conductive resin-rich filler material positioned to make electrical contact with the plurality of metal strands, a conductive inner corona protector positioned to electrically contact and overlie the conductive resin-rich filler material, groundwall insulation positioned to overlie and surround the conductive inner corona protector, and a conductive outer corona protector positioned to overlie and surround the groundwall insulation. The present invention also provides a method for forming a high voltage generator stator coil. The method preferably includes abuttingly contacting a plurality of metal strands in a stacked configuration to thereby form a high voltage conductor having at least a substantially straight portion. The method also includes the step of positioning a conductive resin-rich fleece filler material to electrically contact the high voltage generator stator coil, positioning a conductive inner corona protector to overlie and electrically contact the conductive resin-rich fleece filler material, positioning groundwall insulation to overlie and surround the conductive inner corona protector, and positioning a conductive outer corona protector to overlie and surround the groundwall insulation.

13 Claims, 7 Drawing Sheets

HIGH VOLTAGE GENERATOR STATOR COILS AND METHODS OF FORMING SAME

FIELD OF THE INVENTION

This invention is related to the power generation industry and, more particularly, to the field of generator stator coils.

BACKGROUND

In the power generation industry, power generators have high voltage generator stator coils. As is known in the art, high voltage generator stator coils have a plurality of metal strands and tend to operate at elevated temperatures. Due to the elevated temperatures during operation, partial discharge often occurs. Partial discharge in these systems causes great damage to insulating components positioned on the high voltage generator stator coils. Partial discharge occurs when voltage builds up in certain locations along a high voltage stator coil. Manufacturers and users of high voltage stator coils often have difficulty finding a material suitable for use with high voltage stator coils that will not deteriorate due to elevated temperatures and environmental elements.

Some stator coils, in an attempt to control partial discharge in armature bars, use a plurality of layers of material as seen in U.S. Pat. No. 6,043,582 by Markovitz titled "Stable Conductive Material For High Voltage Armature Bars". The stator coil in Markovitz '582, uses an antimony-doped tin oxide filler material positioned on top and bottom portions of an armature bar. The stator coil in Markovitz '582 also includes strand insulation positioned to surround each of a plurality of copper strands on the armature bar. The antimony-doped tin oxide filler material is then applied to the top and bottom portions of the armature bar. Antimony-doped tin oxide is chosen as the filler material because, according to Markovitz, it is not susceptible to oxidative decomposition. One problem that arises when using antimony-doped tin oxide, however, is that it does not easily fill voids formed during the manufacturing process of high voltage stator coils. Another problem that arises in such systems is that, although a filler based on antimony-doped tin oxide may not be susceptible to oxidation, it is quite susceptible to the elevated temperatures often found in high voltage stator coils. One further problem with this stator coil is that there is no way for excess voltage to be removed. Accordingly, excess voltage can still accumulate and eventually cause partial discharge.

SUMMARY OF THE INVENTION

In view of the foregoing, the present invention advantageously provides a high voltage generator stator coil and methods for protecting the coil from partial discharge. The present invention also advantageously provides an apparatus and method for protecting generator stator coils which are inexpensive, easy to use, and simple to install as understood by those skilled in the art. The present invention still further advantageously provides an apparatus and method for protecting high voltage generator stator coils and surrounding components which are able to sustain exposure to very high temperatures found in high voltage generator stator coils. The present invention also advantageously provides an apparatus that does not contaminate the high voltage stator coil when applied thereto. The apparatus is also advantageously moisture resistant and capable of withstanding environmental elements.

More particularly, high voltage generator stator coil of the present invention preferably includes a plurality of metal strands positioned in a preselected configuration to abuttingly contact one another. The plurality of strands form a high voltage conductor that preferably has a substantially straight portion. The apparatus further includes a conductive resin-rich fleece filler material positioned to make electrical contact with and overlie the plurality of metal strands and an inner corona protector positioned to overlie the conductive filler material and surround the plurality of metal strands. The stator coil also includes groundwall insulation positioned to overlie and surround the inner corona protector and an outer corona protector positioned to overlie and surround the groundwall insulation. The outer corona protector can be advantageously positioned to make electrical contact with the inner corona protector through the groundwall insulation in at least two different locations along the substantially straight portion of the high voltage generator stator coil.

This configuration of the high voltage generator stator coil advantageously allows a conductive resin-rich fleece filler material to fill voids in the high voltage conductor. These voids are a major source of partial discharge and are often formed during the manufacturing process. Voids in the high voltage conductor provide porosity which can be advantageous in certain types of coil construction such as vacuum pressure impregnation. Due to the porosity of the high voltage conductor, the conductive resin-rich fleece filler material can advantageously fill voids on the top and bottom portions of the high voltage generator stator coil, for example. The conductive resin-rich fleece filler material is also advantageously resistant to high temperatures and is weather resistant.

The present invention also advantageously provides a method for forming a high voltage generator stator coil. The method includes abuttingly contacting a plurality of metal strands to form a high voltage conductor having at least a substantially straight portion. The method also includes positioning a conductive resin-rich fleece filler material to contact upper and lower surfaces of the high voltage stator coil and positioning an inner corona protector to electrically contact and surround the conductive resin-rich fleece filler material. The method further includes positioning groundwall insulation to overlie and surround the inner corona protector and positioning an outer corona protector to overlie and surround the groundwall insulation. The method can also advantageously include contacting the inner and outer corona protectors through the groundwall insulation along the straight portion of the high voltage generator stator coil. This connection thereby relieves voltage buildup in the high voltage generator stator coil and prevents partial discharge.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

Figure 1:
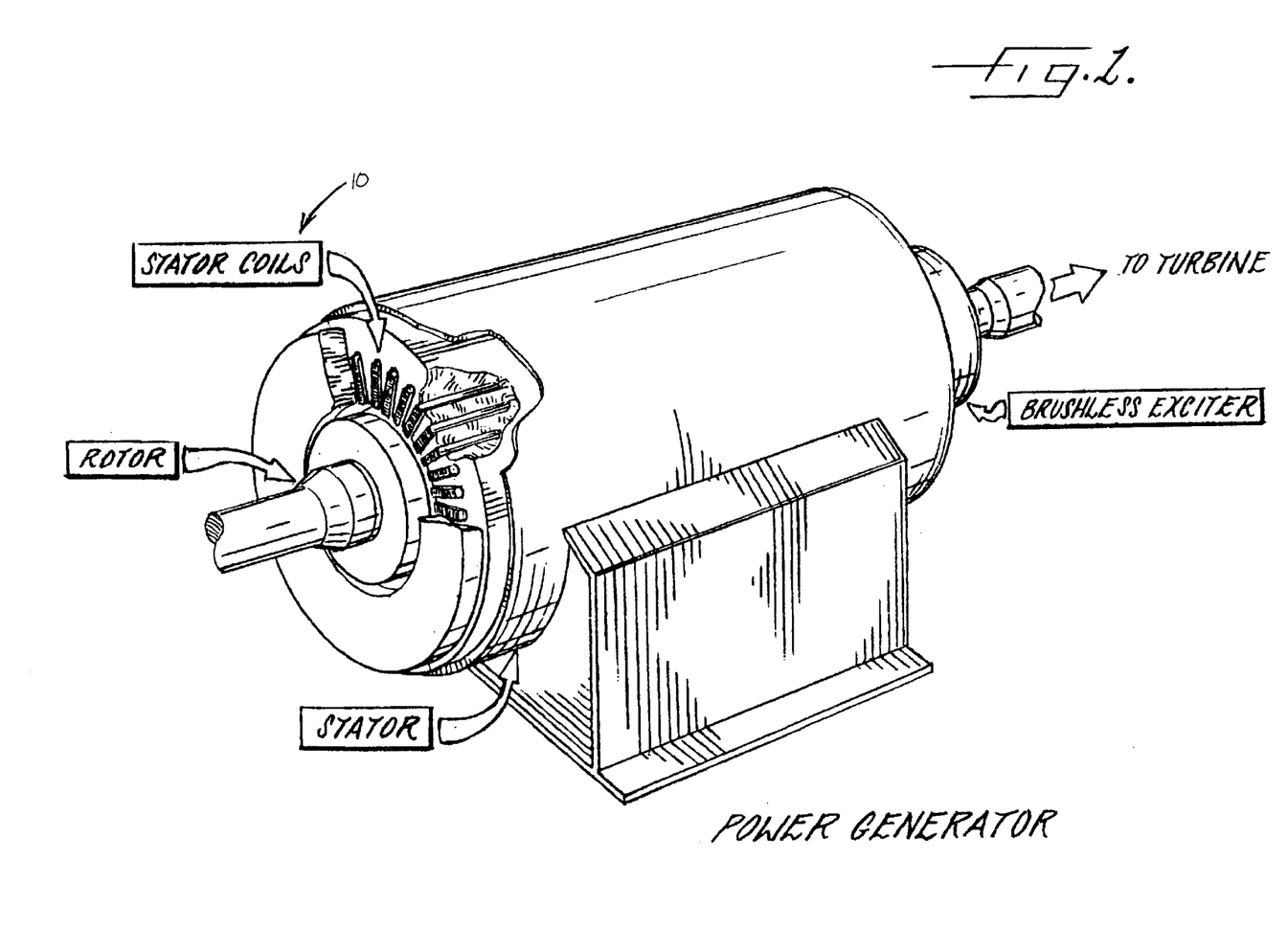
FIG. 1 is a fragmented perspective view of a power generation system having a plurality of stator coils according to the present invention.

During the manufacturing process of high voltage generator stator coils 10 for power generation systems (see FIG. 1), voids are formed in portions of a high voltage conductor 18. The voids are normally formed in substantially straight elongate portions 20 of the conductor 18 across which voltage passes. Voltage tends to build up in the voids causing small explosions, or partial discharge. Partial discharge damages insulating components of high voltage generator stator coils 10.

Figure 2:
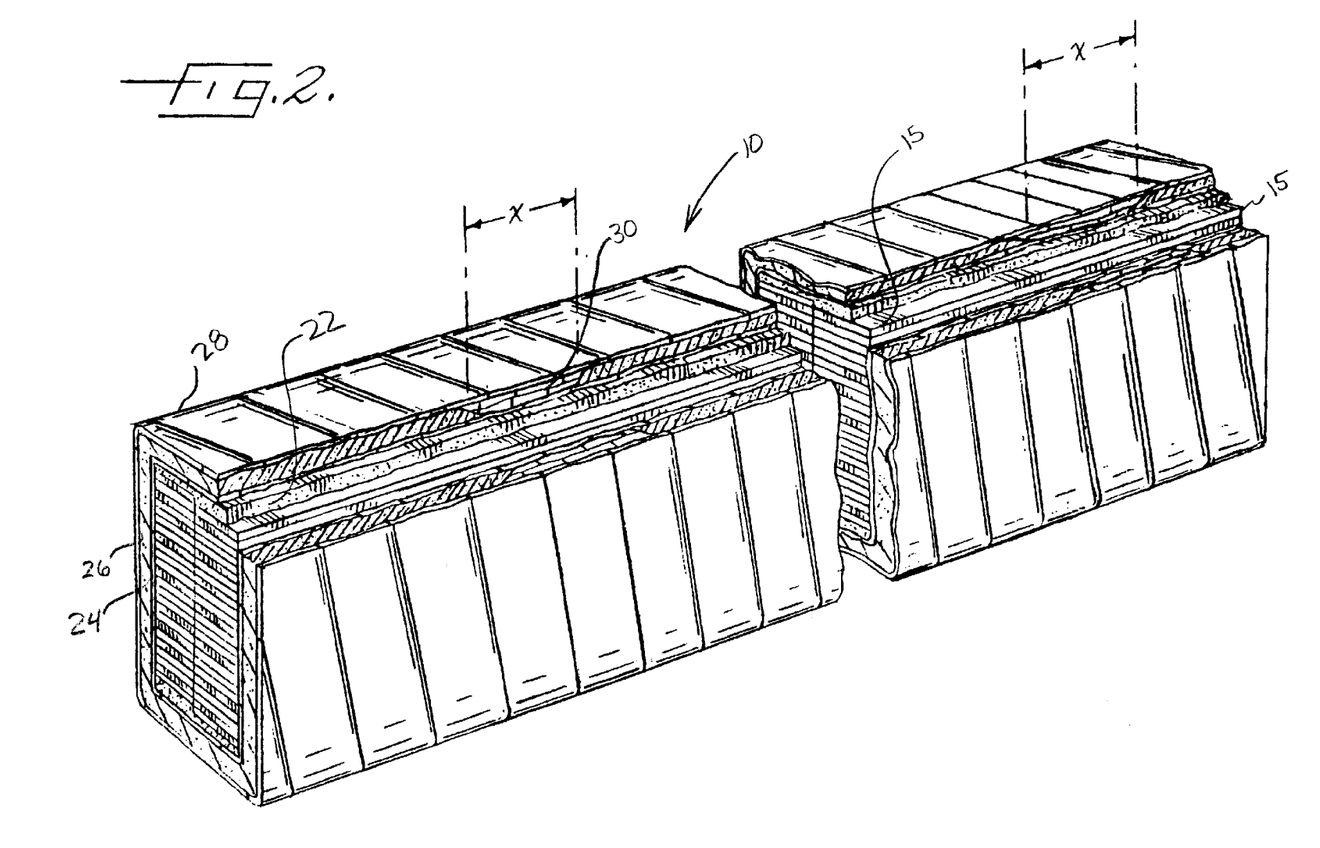
FIG. 2 is a fragmented perspective view of a high voltage generator stator coil according to the present invention.
Figure 8:
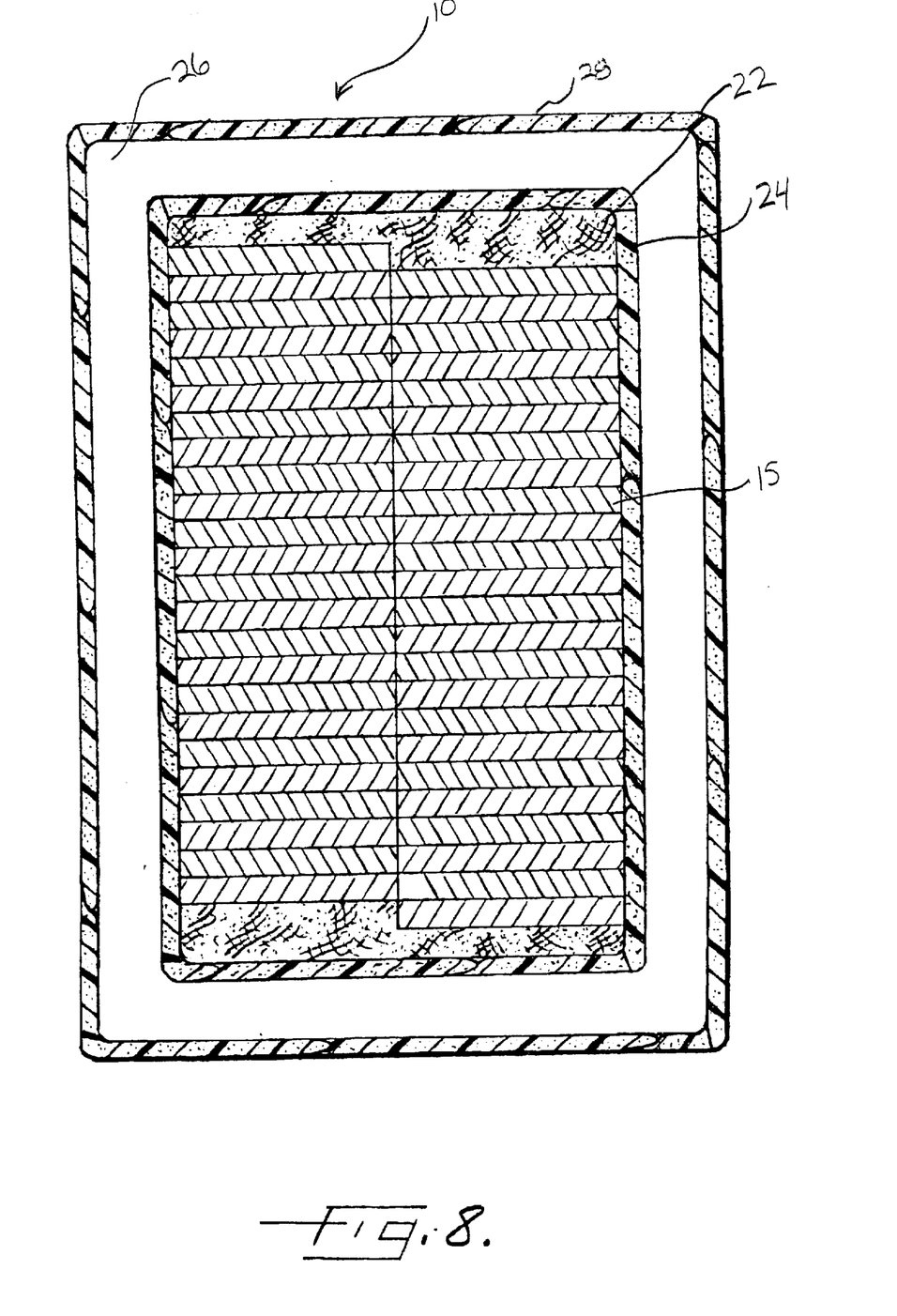
FIG. 8 is a sectional view of a high voltage generator stator coil taken along line 8—8 of FIG. 5 according to the present invention.
Figure 9:
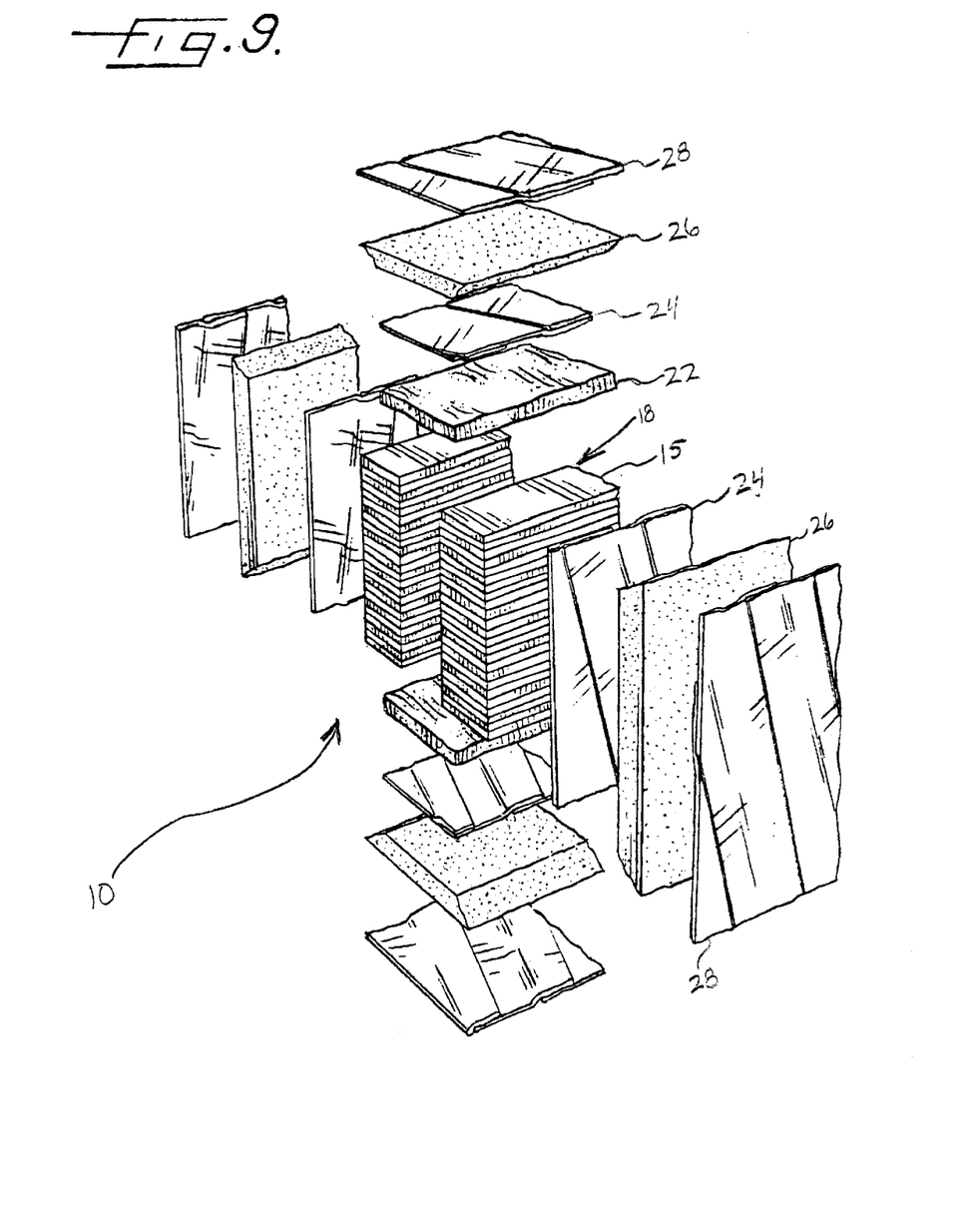
FIG. 9 is an exploded view of a high voltage generator stator coil according to the present invention.

As illustrated in FIG. 2, the present invention provides a high voltage generator stator coil 10 for preventing this partial discharge from occurring. The stator coil 10 includes a plurality of metal strands 15, e.g., preferably formed of copper or a copper alloy, positioned in a stacked configuration to form a high voltage conductor 18. As perhaps best illustrated in FIGS. 8–9, the plurality of metal strands 15 are preferably configured in a two-tier stacked configuration as understood by those skilled in the art. The high voltage generator stator coil 10 also includes at least a substantially straight portion 20.

Figure 3:
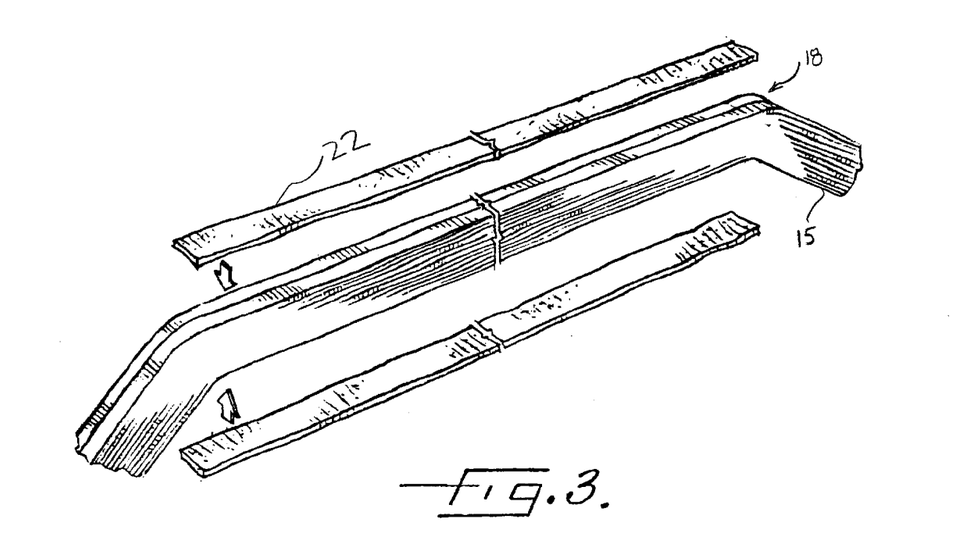
FIG. 3 is an exploded view of a high voltage generator stator coil showing a plurality of metal strands and conductive filler material according to the present invention.

The high voltage generator stator coil 10 preferably also includes a conductive filler material 22 positioned to electrically contact upper and lower portions of the plurality of high voltage conductor 18, as illustrated in FIG. 3. The conductive filler material 22 is positioned to fill the voids formed in the high voltage conductor 18 during the manufacturing process. The conductive filler material 22 is pressed and cured by a heat cycle when applied to the upper and lower portions of the high voltage conductor 18. The heat cycle causes the conductive filler material 22 to become rigid and thereby form a smooth surface on the upper and lower portions of the high voltage generator stator coil 10 (See FIG. 3).

The conductive filler material 22 can advantageously be a resin-rich fleece material. The stator coil 10 is preferably formed using vacuum pressure impregnation. Resin-rich fleece filler material 22 is advantageous because the resin aids in filling the voids in the high voltage conductor 18 during the vacuum pressure impregnation. Fleece is advantageously included in the conductive filler material 22. The fleece, for example, can be a Nomex or Dacron fleece as understood by those skilled in the art. Fleece is advantageous because it does not contaminate the high voltage stator coil 10 when applied to the high voltage conductor 18. The conductive resin-rich fleece filler material 22 also includes vacuum impregnated felt. An electrical connection is made through a capacitive coupling between the conductive resin-rich filler material 22 and the plurality of strands 15. The capacitive coupling between the filler material 22 and the plurality of metal strands 15 forces an equal voltage distribution along the length of the conductive resin-rich filler material 22.

The conductive resin-rich fleece filler material 22 preferably is substantially moisture resistant and has a surface resistance between the range of about 150 to about 250 Ohms per square. The filler material 22 still further has a thickness between the range of about 0.07 inches in a compressed state and about 0.13 inches in a relaxed state. The conductive resin-rich fleece filler material 22 is positioned to extend along the upper and lower surfaces of the high voltage generator stator coil 10 substantially the entire length of the substantially straight portion 20.

The conductive resin-rich fleece filler material 22 is advantageous because it withstands high temperature conditions normally found in high voltage generator stator coils 10. This filler material 22 is also advantageous because it is substantially resistant to environmental conditions. The conductive resin-rich fleece filler material 22 is still further advantageous because it does not contaminate the high voltage generator stator coil 10 during the manufacturing process. Yet another advantage of the conductive resin-rich fleece filler material 22 is the ease with which it can be applied to the high voltage generator stator coil 10 as understood by those skilled in the art. Another advantage of the conductive resin-rich fleece filler material 22 is that it is an inexpensive solution to the expensive problem of partial discharge.

Figure 4:
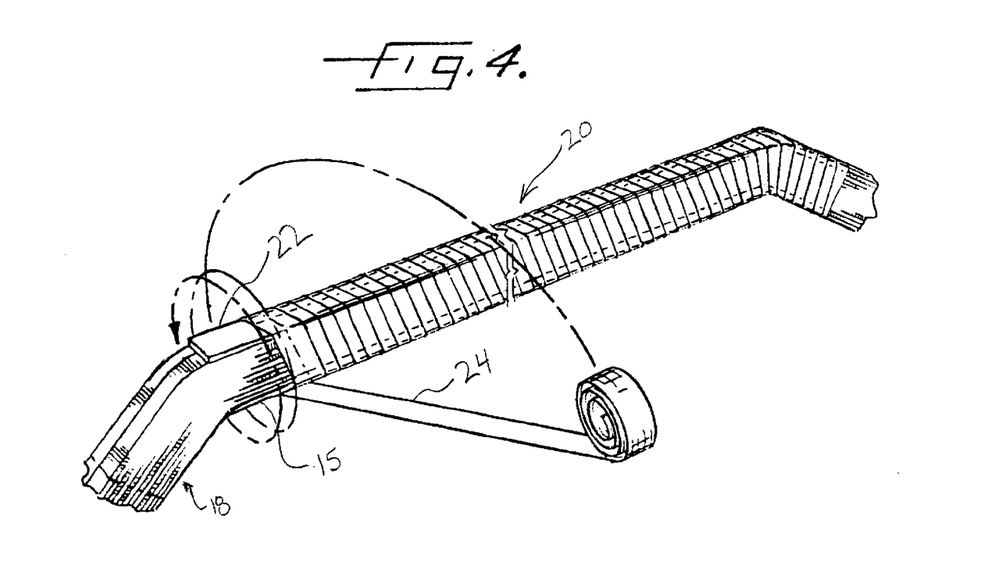
FIG. 4 is a perspective view of a high voltage generator stator coil showing the conductive filler material and an inner corona protector according to the present invention.

The high voltage generator stator coil 10 also includes a conductive inner corona protector 24. The conductive inner corona protector 24 is positioned to electrically contact and overlie the conductive resin-rich fleece filler material 22. The conductive inner corona protector 24 is preferably conductive tape positioned in a one-half lap layer configuration to surround the conductive filler material 22 and the plurality of metal strands 15 (See FIG. 4). The conductive inner corona protector 24 extends along the upper and lower surfaces of the stator coil 10 substantially the entire length of the substantially straight portion 20 of the high voltage generator stator coil 10.

The stator coil 10 further includes groundwall insulation 26 positioned to contact and surround the inner corona protector 24. The groundwall insulation 26 is preferably insulating tape. Insulating tape is advantageously easy to apply and insures that an insulating layer is positioned over the conductive inner corona protector 24 (See FIG. 5). After the groundwall insulation 26 is applied, the high voltage generator stator coil 10 is vacuum pressure impregnated with an epoxy resin. This advantageously allows for the conductive resin-rich filler material 22 to fill the voids in the high voltage conductor 18 formed during the manufacturing process. When the filler material 22 fills the voids, there cannot be a buildup of voltage and therefore, partial discharge will not occur.

Figure 5:
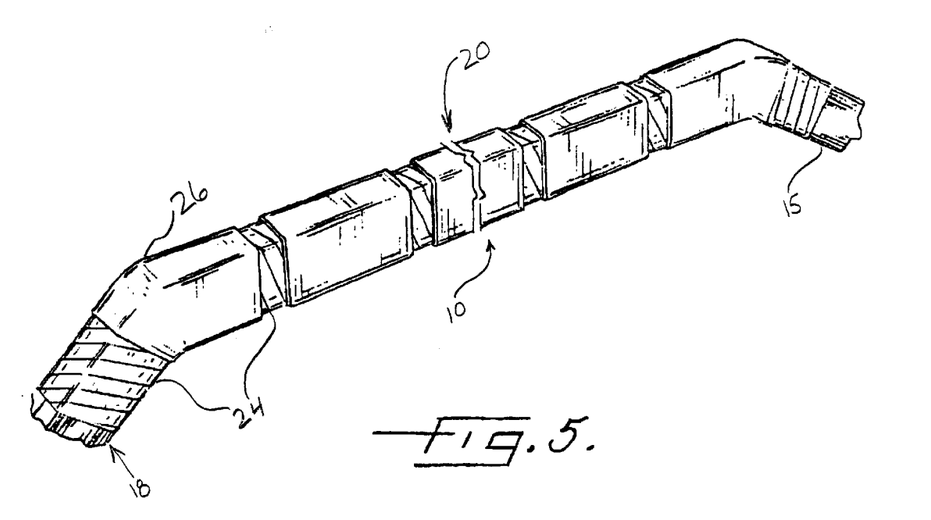
FIG. 5 is a perspective view of a high voltage generator stator coil showing groundwall insulation positioned to overlie the inner corona protector according to the present invention.
Figure 6:
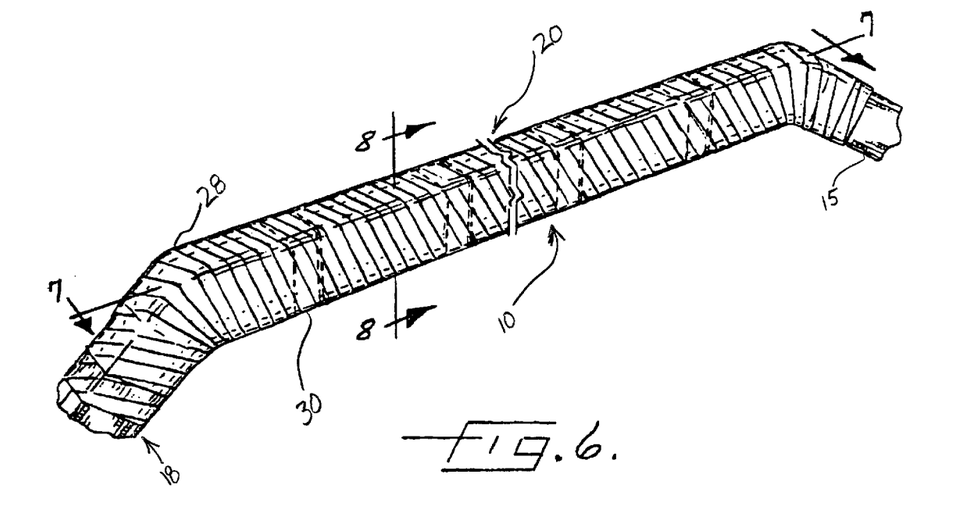
FIG. 6 is a perspective view of a high voltage generator stator coil showing a conductive outer corona protector positioned to overlie the groundwall insulation according to the present invention.
Figure 7:
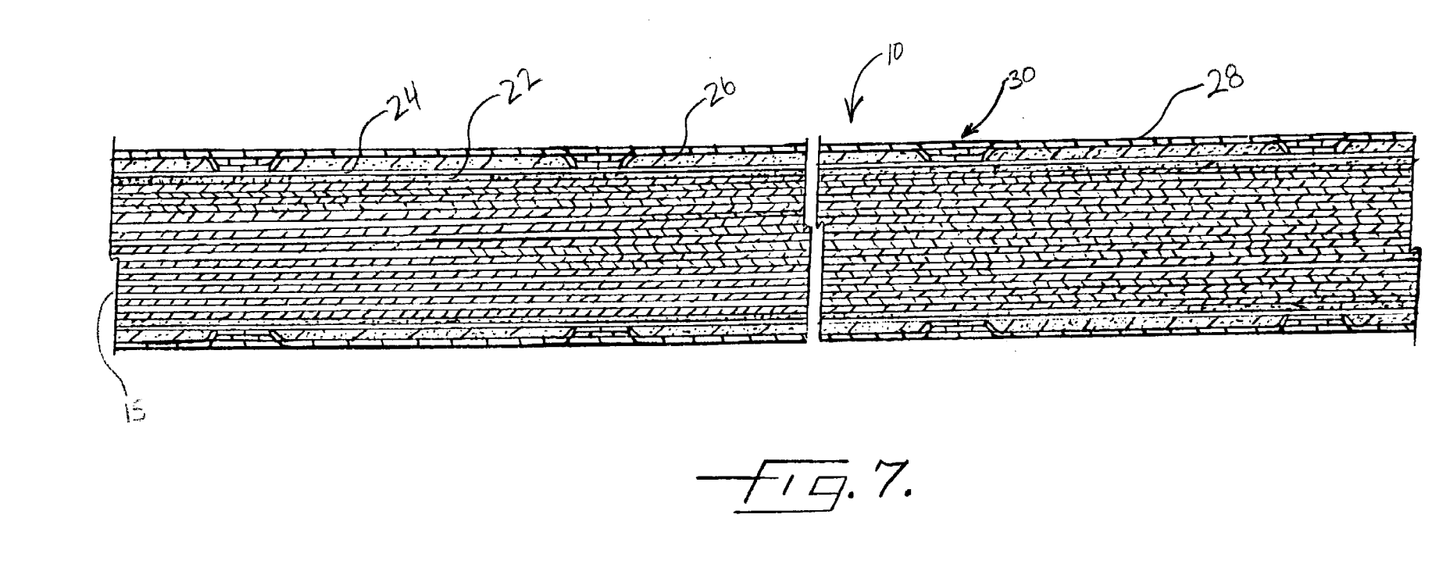
FIG. 7 is a sectional view of a high voltage generator stator coil taken along line 7—7 of FIG. 6 according to the present invention.

The stator coil 10 still further includes a conductive outer corona protector 28. The outer corona protector 28 is positioned to overlie and surround the groundwall insulation 26. The conductive outer corona protector 28 can also advantageously be conductive tape positioned in a one-half lap layer configuration to overlie and surround the groundwall insulation 26, as illustrated in FIG. 6. The conductive outer corona protector 28 is also preferably positioned to electrically contact, e.g., abuttingly contact such as an overlapping region in the tape as shown in FIGS. 5–7, the conductive inner corona protector 24 through the groundwall insulation 26 in at least two different locations 30 along the straight portion 20 of the high voltage generator stator coil 10. The inner corona protector 24 and the outer corona protector 28 are in electrical contact 30 with one another for a preselected length X, as best illustrated in FIG. 2. The contact 30 between the conductive inner corona protector 24 and the conductive outer corona protector 28 through the groundwall insulation 26 advantageously provides a path along which voltage buildup may travel and be removed from the high voltage generator stator coil 10 before partial discharge occurs.

As illustrated in FIGS. 1–9, the present invention also advantageously provides methods for forming a high voltage generator stator coil 10. The method includes abuttingly contacting a plurality of metal strands 15 in a stacked configuration to thereby form a high voltage conductor 18 having at least a substantially straight portion 20. The plurality of metal strands 15 are positioned in a preselected stacked configuration. The plurality of metal strands 15 can also be positioned in a two-tier stacked configuration as understood by those skilled in the art. The method also advantageously includes positioning a conductive resin-rich fleece filler material 22 to electrically contact the high voltage generator stator coil 10. The method still further advantageously includes positioning a conductive inner corona protector 24 to overlie and electrically contact the conductive resin-rich fleece filler material 22. The method still further includes positioning groundwall insulation 26 to overlie and surround the conductive inner corona protector 24. The method also advantageously includes positioning a conductive outer corona protector 28 to overlie and surround the groundwall insulation 26.

The step of positioning the conductive resin-rich fleece filler material 22 to electrically contact the high voltage conductor 18 preferably includes the step of filling voids in the high voltage conductor 18 with the conductive resin-rich filler fleece material 22. This method advantageously provides simple and inexpensive installation as understood by those skilled in the art. This method further advantageously prevents voltage buildup in the voids of the conductor 18 to thereby prevent partial discharge.

The method of forming the high voltage generator stator coil 10 can also include electrically contacting the conductive inner corona protector 24 with the conductive outer corona protector 28 through the groundwall insulation 26, as best illustrated in FIGS. 2 and 7. The conductive inner corona protector 24 and the conductive outer corona protector 28 electrically contact 30 one another through the groundwall insulation 26 in a plurality of locations along a substantially straight portion 20 of the high voltage generator stator coil 10. The inner corona protector 24 and the outer corona protector 28 electrically contact 30 one another for a preselected length X, as best illustrated in FIG. 2. The electrical contact 30 between the conductive inner 24 and outer 28 corona protectors advantageously provides a path along which voltage can travel so as not to accumulate and result in partial discharge.

The method of forming the high voltage generator stator coil 10 can also advantageously include vacuum pressure impregnating the high voltage generator stator coil 10 with epoxy resin after the groundwall insulation 26 is applied over the conductive inner corona protector 24. The step of vacuum pressure impregnating the high voltage generator stator coil 10 advantageously fills voids in the high voltage conductor 18 formed during the manufacturing process as understood by those skilled in the art.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

What is claimed is:

1. A high voltage generator stator coil comprising:

a plurality of metal strands positioned in a stacked configuration to thereby form a high voltage conductor having at least a substantially straight portion;

a conductive resin-rich fleece filler material positioned to electrically contact the plurality of metal strands;

a conductive inner corona protector positioned to electrically contact and overlie the conductive filler material and surround the plurality of metal strands;

groundwall insulation positioned to overlie and surround the conductive inner corona protector; and a conductive outer corona protector positioned to overlie and surround the groundwall insulation and also positioned to electrically contact the conductive inner corona protector through the groundwall insulation in at least two different locations along the straight portion of the high voltage generator stator coil.

2. The high voltage generator stator coil as defined in claim 1, wherein the conductive resin-rich fleece filler material further comprises epoxy impregnated felt and is positioned to fill voids in upper and lower surfaces of the high voltage conductor.

3. The high voltage generator stator coil as defined in claim 2, wherein the conductive resin-rich fleece filler material is substantially moisture resistant, has a surface resistance between the range of about 150 and about 250 Ohms per square, has a thickness between the range of about 0.07 and about 0.13 inches, is rigid and substantially smooth, and is positioned to extend along the upper and lower surfaces of the high voltage conductor substantially the entire length of the substantially straight portion of the high voltage generator conductor.

4. The high voltage generator stator coil as defined in claim 3, wherein the conductive inner corona protector comprises conductive tape positioned in a one-half lap layer configuration to electrically contact and overlie the conductive resin-rich fleece filler material, and wherein the conductive inner corona protector extends along upper and lower surfaces of the coil substantially the entire length of the substantially straight portion of the high voltage conductor.

5. The high voltage generator stator coil as defined in claim 4, wherein the conductive outer corona protector comprises conductive tape positioned in a one-half lap layer configuration to overlie and surround the groundwall insulation.

6. A high voltage generator stator coil comprising:

a plurality of metal strands positioned in a stacked configuration to thereby form a high voltage conductor having at least a substantially straight portion;

a conductive resin-rich filler material positioned to electrically contact the plurality of metal strands;

a conductive inner corona protector positioned to electrically contact and overlie the conductive resin-rich filler material and surround the plurality of metal strands;

groundwall insulation positioned to overlie and surround the conductive inner corona protector; and a conductive outer corona protector positioned to overlie and surround the groundwall insulation;

wherein the conductive resin-rich filler material is substantially moisture resistant, has a surface resistance between the range of about 150 and about 250 Ohms per square, has a thickness between the range of about 0.07 and about 0.13 inches, is rigid and substantially smooth along peripheral outer surfaces, and is positioned to fill voids in and extend along upper and lower portions of the high voltage conductor substantially the entire length of the substantially straight portion of the high voltage conductor.

7. The high voltage generator stator coil as defined in claim 6, wherein the conductive inner corona protector comprises conductive tape positioned in a one-half lap layer configuration to electrically contact and overlie the conductive resin-rich filler material, and wherein the conductive inner corona protector extends along upper and lower surfaces of the high voltage generator stator coil substantially the entire length of the substantially straight portion of the high voltage conductor.

8. The high voltage generator stator coil as defined in claim 6, wherein the conductive outer corona protector comprises conductive tape positioned in a one-half lap layer configuration to overlie and surround the groundwall insulation.

9. A high voltage generator stator comprising:

a plurality of metal strands positioned in a stacked configuration to thereby form a high voltage conductor having at least a substantially straight portion;

a conductive filler material positioned to electrically contact the plurality of metal strands;

a conductive inner corona protector positioned to electrically contact and overlie the conductive filler material and surround the plurality of metal strands;

groundwall insulation positioned to overlie and surround the inner corona protector; and a conductive outer corona protector positioned to overlie and surround the groundwall insulation and also positioned to electrically contact the conductive inner corona protector through the groundwall insulation in a plurality of locations along the substantially straight portions of the high voltage generator stator coil.

10. The high voltage generator stator coil as defined in claim 9, wherein the conductive filler material is substantially moisture resistant, has a surface resistance between the range of about 150 and about 250 Ohms per square, has a thickness between the range of about 0.07 and about 0.13 inches, is rigid and substantially smooth along peripheral outer surfaces, and is positioned to fill voids and extend along upper and lower portions of the high voltage conductor substantially the entire length of the substantially straight portion of the high voltage conductor.

11. The high voltage generator stator coil as defined in claim 10, wherein the conductive inner corona protector comprises conductive tape positioned in a one-half lap layer configuration to electrically contact and overlie the conductive filler material, and wherein the conductive inner corona protector extends along upper and lower surfaces of the high voltage generator stator coil substantially the entire length of the substantially straight portion of the high voltage conductor.

12. The high voltage generator stator coil as defined in claim 11, wherein the conductive outer corona protector comprises conductive tape positioned in a one-half lap layer configuration to overlie and surround the groundwall insulation.

13. A method of forming a high voltage generator stator coil, the method comprising the steps of:

abuttingly contacting a plurality of metal strands in a stacked configuration to thereby form a high voltage conductor having at least a substantially straight portion;

positioning a conductive resin-rich fleece filler material to electrically contact the high voltage conductor and to fill voids in upper and lower surfaces of the high voltage conductor;

positioning a conductive inner corona protector to overlie and electrically contact the conductive resin-rich fleece filler material by wrapping conductive tape in a half-lap layer configuration to surround the conductive resin-rich fleece filler material and the high voltage conductor;

positioning groundwall insulation to overlie and surround the conductive inner corona protector;

positioning a conductive outer corona protector to overlie and surround the groundwall insulation by wrapping conductive tape to overlie and surround the groundwall insulation;

vacuum pressure impregnating the high voltage generator stator coil with epoxy resin after the groundwall insulation is applied over the conductive inner corona protector to fill voids in the high voltage conductor and thereby prevent partial discharge; and contacting the conductive inner and outer corona protectors in at least two locations along the straight portion of the high voltage generator stator coil.

* * * * *